US012730916B2

(12) United States Patent
Bober et al.

(10) Patent No.: US 12,730,916 B2
(45) Date of Patent: Sep. 8, 2026

(54) DATA PROTECTION USING POLICY-BASED DIGITAL VAULT ROTATION

(71) Applicant: Dell Products L.P., Round Rock, TX (US)

(72) Inventors: Roman Bober, Ha Darom (IL); Maxim Balin, Gan-Yavne (IL); Stav Sapir, Beer Sheba (IL)

(73) Assignee: Dell Products L.P., Round Rock, TX (US)

( * ) Notice: Subject to any disclaimer, the term of this patent is extended or adjusted under 35 U.S.C. 154(b) by 392 days.

(21) Appl. No.: 18/330,789

(22) Filed: Jun. 7, 2023

(65) Prior Publication Data

US 2024/0411910 A1 Dec. 12, 2024

(51) Int. Cl.
*G06F 21/62* (2013.01)
*H04L 9/40* (2022.01)

(52) U.S. Cl.
CPC ...... *G06F 21/6218* (2013.01); *H04L 63/0281* (2013.01); *H04L 63/105* (2013.01); *H04L 63/20* (2013.01)

(58) Field of Classification Search
CPC ............. G06F 21/6218; H04L 63/0281; H04L 63/105; H04L 63/20
See application file for complete search history.

(56) References Cited

U.S. PATENT DOCUMENTS 6,795,920 B1 * 9/2004 Bacha ..................... H04L 63/12 713/193
8,327,324 B1 * 12/2012 Gong .................. G06F 11/3624 717/110
9,722,974 B1 * 8/2017 Fuller ................... H04L 9/0836
10,636,011 B2 * 4/2020 Nishimura ............. G06Q 10/06
11,144,513 B1 * 10/2021 Padisetty .............. G06F 16/122
(Continued)

FOREIGN PATENT DOCUMENTS

JP 7311981 B2 * 7/2023 ......... G06F 13/4221
WO WO-2024211723 A1 * 10/2024 ........... G06F 21/335

OTHER PUBLICATIONS

"Data Migration Service"; IBM Cloud Object Storage System™; Version 3.14.12; downloaded Jun. 5, 2023.
(Continued)

*Primary Examiner* — John B King
(74) *Attorney, Agent, or Firm* — Ryan, Mason & Lewis, LLP

(57) ABSTRACT

Techniques are provided for data protection using policy-based digital vault rotation. One method comprises obtaining data to be stored; selecting one of multiple digital vaults; and storing the data in the selected digital vault, wherein a different one of the multiple digital vaults is selected using a rotation policy in response to rotation criteria being satisfied and wherein the data is moved to the selected different digital vault. The multiple digital vaults may comprise multiple digital vaults having different memory spaces on a given device and/or multiple digital vaults on different devices. The multiple digital vaults may only respond to a designated vault proxy service. An active digital vault may be identified using the rotation policy in response to a request for data and the data may be retrieved from the active digital vault and provided to a requester associated with the request.

20 Claims, 7 Drawing Sheets

(56) References Cited

U.S. PATENT DOCUMENTS

| | | | | |
|---|---|---|---|---|
| 11,816,236 | B1 * | 11/2023 | Gupta | G06F 21/6218 |
| 2006/0225132 | A1 * | 10/2006 | Swift | G06F 21/33 726/11 |
| 2010/0169541 | A1 * | 7/2010 | Freikorn | G06F 12/0246 711/E12.001 |
| 2014/0136685 | A1 * | 5/2014 | Chan | H04L 41/142 709/224 |
| 2015/0222604 | A1 * | 8/2015 | Ylonen | H04L 9/14 713/171 |
| 2015/0304292 | A1 * | 10/2015 | Dulkin | G06F 21/31 726/7 |
| 2015/0309929 | A1 * | 10/2015 | Ishii | G06F 16/185 711/117 |
| 2016/0234225 | A1 * | 8/2016 | Lane | H04L 67/02 |
| 2016/0330244 | A1 * | 11/2016 | Denton | G06F 16/182 |
| 2019/0156416 | A1 * | 5/2019 | Jayaram | G06Q 30/0201 |
| 2019/0229908 | A1 * | 7/2019 | Peddada | G06F 21/602 |
| 2019/0286718 | A1 * | 9/2019 | Norman | G06F 16/2255 |
| 2021/0044637 | A1 * | 2/2021 | Lee | H04L 65/4025 |
| 2021/0048956 | A1 * | 2/2021 | Wang | G06F 3/0604 |
| 2023/0224154 | A1 * | 7/2023 | Gopalakrishna | H04L 9/0891 713/171 |
| 2023/0336339 | A1 * | 10/2023 | Karadigudda | H04L 9/0894 |
| 2024/0171414 | A1 * | 5/2024 | Johnson | H04L 9/50 |

OTHER PUBLICATIONS

"Manage Secrets and Protect Sensitive Data with Vault"; https://www.vaultproject.io/; downloaded Jun. 5, 2023.

Ahluwalia, Manish; "What is a Data Privacy Vault?"; dated Jun. 23, 2022; https://www.skyflow.com/post/what-is-a-data-privacy-vault; downloaded Jun. 5, 2023.

Falconer, Sean; "Why Everyone Needs a Data Privacy Vault"; dated Mar. 12, 2022; https://softwareengineeringdaily.com/2022/03/12/why-everyone-needs-a-data-privacy-vault/; downloaded Jun. 5, 2023.

* cited by examiner

DATA PROTECTION USING POLICY-BASED DIGITAL VAULT ROTATION

BACKGROUND

Data protection techniques are often employed to secure information. Role-based access control (RBAC) techniques may be employed, for example, to restrict access to such information based on the roles of individual users within an organization. RBAC techniques typically allow users to access only the information needed for their jobs. RBAC techniques, however, are vulnerable to various types of attacks, such as password theft and/or session hijacking.

A need exists for improved techniques for protecting data from suspicious and/or unauthorized computer operations.

SUMMARY

Illustrative embodiments of the disclosure provide techniques for data protection using policy-based digital vault rotation. In one embodiment, a method comprises obtaining data to be stored; selecting one of a plurality of digital vaults; and storing the data in the selected digital vault, wherein a different one of the plurality of digital vaults is selected using a rotation policy in response to one or more rotation criteria being satisfied and wherein the data is moved to the selected different digital vault.

In some embodiments, the data may be encrypted. The data may comprise one or more of a secret, a key, a certificate and designated data. The plurality of digital vaults may comprise one or more of a plurality of digital vaults having different memory spaces of a given device and a plurality of digital vaults on different devices.

In at least one embodiment, the plurality of digital vaults may only respond to one or more designated vault proxy services. The one or more designated vault proxy services may have direct access to one or more of the plurality of digital vaults and other devices may access the one or more of the plurality of digital vaults using at least one of the one or more designated vault proxy services.

In one or more embodiments, an active one of the plurality of vaults may be identified using the rotation policy in response to a request for at least a portion of the data and the at least a portion of the data may be retrieved from the active vault and the at least a portion of the data may be provided to a requester associated with the request.

Illustrative embodiments can provide significant advantages relative to conventional techniques. For example, technical problems associated with data protection are mitigated in one or more embodiments by moving data to a different vault in response to one or more rotation criteria being satisfied.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for data protection using policy-based digital vault rotation.

In one or more embodiments, data protection techniques are provided to securely store designated information in a digital vault network comprising multiple digital vault instances. As used herein, the term "digital vault" shall encompass, for example, an online security vault, a password vault and/or another secure storage element, as would be apparent to a person of ordinary skill in the art. Rotation algorithms, for example, based on one or more rotation policies, are employed to move the data between the digital vault instances. In some embodiments, a vault proxy service employs the disclosed rotation algorithms to identify an active digital vault instance and to process data requests and queries using the active digital vault instance. The disclosed data protection techniques provide enhanced security by utilizing multiple digital vault instances and automatically rotating designated data, thereby reducing the risk of data breaches and the hijacking of the protected information. As used herein, the term "rotation" (and variants thereof) shall be broadly construed to encompass any movement of data in accordance with a designated policy and is not meant to convey any particular direction or regularity of such data movements, as would be apparent to a person of ordinary skill in the art based on the present disclosure.

Figure 1:
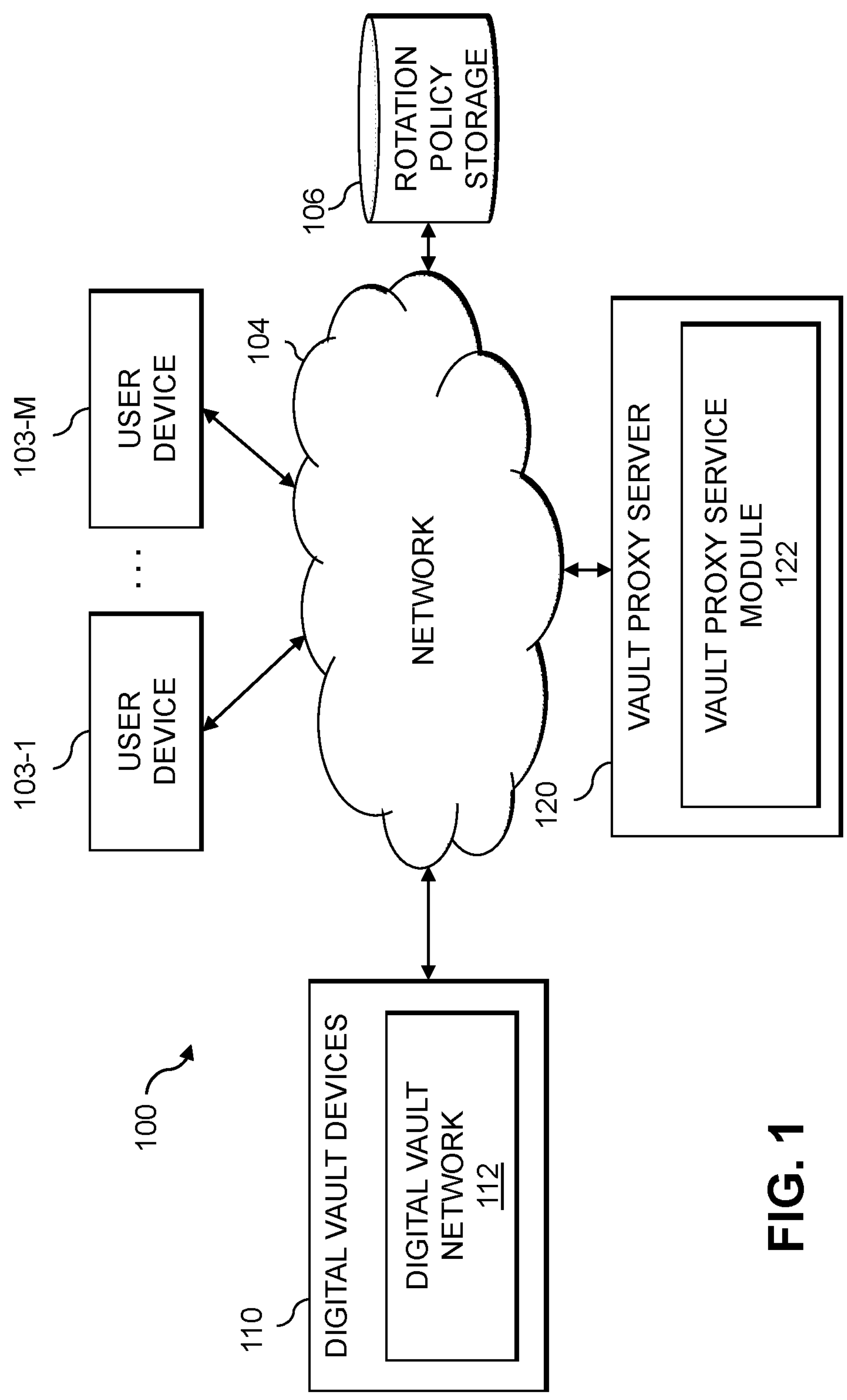
FIG. 1 illustrates an information processing system configured for data protection using policy-based digital vault rotation in an illustrative embodiment.

FIG. 1 shows a computer network (also referred to herein as an information processing system) 100 configured in an illustrative embodiment. The computer network 100 comprises a plurality of user devices 103-1 through 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 are one or more digital vault devices 110, one or more vault proxy servers 120 and a rotation policy storage 106, discussed below.

As shown in FIG. 1, an exemplary digital vault device 110 may comprise a digital vault network 112 (or a portion thereof). In some embodiments, the digital vault network 112 comprises a plurality of digital vaults that may store protected data, as discussed further below in conjunction with FIGS. 2 through 4, for example. It is to be appreciated that this particular arrangement of the digital vault network 112 illustrated in the one or more digital vault devices 110 of the FIG. 1 embodiment is presented by way of example only, and alternative arrangements can be used in other embodiments. For example, the functionality associated with the digital vault network 112 in other embodiments can be separated across a larger number of digital vault devices 110. As another example, multiple distinct processors can be used to implement different ones of the digital vault network 112, or portions thereof.

At least portions of the digital vault network 112 may be implemented at least in part in the form of software that is stored in memory and executed by a processor. An exemplary process utilizing the digital vault network 112 of the one or more digital vault devices 110 in computer network 100 will be described in more detail with reference to FIGS. 2 through 4, for example. Other digital vault devices 110 (not shown in FIG. 1) are assumed to be configured in a manner similar to that shown for digital vault device 110 in the figure.

The user devices 103 may comprise, for example, physical computing devices such as host devices, edge devices and/or other devices such as mobile telephones, laptop computers, tablet computers, desktop computers, Internet of things (IoT) devices, or other types of computing devices. Such devices are examples of what are more generally referred to herein as "processing devices" which may be protected using the disclosed device protection techniques. Some of these processing devices are also generally referred to herein as "computers." The digital vault devices 110 may comprise, for example, user devices, storage devices or virtual resources that comprise a digital vault network 112 (or a portion thereof). The user devices 103 and digital vault devices 110 may comprise a network client that includes networking capabilities such as ethernet, Wi-Fi, etc. When the user devices 103, for example, are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary vault proxy server 120 may comprise a vault proxy service module 122. In some embodiments, the vault proxy service module 122 is a centralized proxy that interacts with the digital vault network 112 for storage and retrieval of protected data, as discussed further below in conjunction with FIGS. 2 through 4, for example. It is to be appreciated that this particular arrangement of the vault proxy service module 122 illustrated in the vault proxy server 120 of the FIG. 1 embodiment is presented by way of example only, and alternative arrangements can be used in other embodiments. For example, the functionality associated with the vault proxy service module 122 in other embodiments can be separated across a larger number of vault proxy servers 120. As another example, multiple distinct processors can be used to implement different ones of the vault proxy service module 122, or portions thereof.

At least portions of vault proxy service module 122 may be implemented at least in part in the form of software that is stored in memory and executed by a processor. An exemplary process utilizing vault proxy service module 122 of the vault proxy server 120 in computer network 100 will be described in more detail with reference to FIGS. 2 through 4, for example.

The vault proxy server 120 may be implemented, for example, on the cloud, such as a private cloud, or on the premises of an enterprise or another entity. In some embodiments, the vault proxy server 120, or portions thereof, may be implemented as part of a host device. The vault proxy server 120 may implement server-side functionality associated with the disclosed data protection techniques, such as, for example, storage and retrieval of protected data using the digital vault network 112 and implementing vault rotation policies.

Additionally, the one or more digital vault devices 110 and/or the vault proxy server 120 can have an associated rotation policy storage 106 configured to store, for example, the vault rotation policies and associated rotation timeout criteria. The rotation policy storage 106 in the present embodiment may be implemented using one or more storage systems associated with the vault proxy server 120. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more digital vault devices 110, user devices 103 and/or vault proxy servers 120 may be implemented on a common processing platform, or on separate processing platforms. The one or more digital vault devices 110 and user devices 103 may be configured to interact over the network 104 in at least some embodiments with the vault proxy server 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103 and the one or more vault proxy servers 120 to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the user devices 103, the one or more digital vault devices 110 and/or the one or more vault proxy servers 120 can be one or more input-output devices (not shown), which illustratively comprise keyboards, displays or other types of input-output devices in any combination. Such input-output devices can be used, for example, to support one or more user interfaces to the vault proxy server 120, as well as to support communication between the vault proxy server 120 and other related systems and devices not explicitly shown.

The user devices 103, the one or more digital vault devices 110 and/or the one or more vault proxy servers 120 in the FIG. 1 embodiment are assumed to be implemented using at least one processing device. Each such processing device generally comprises at least one processor and an associated memory and implements one or more functional modules for controlling certain features of the respective device.

More particularly, the user devices 103, the one or more digital vault devices 110 and/or the one or more vault proxy servers 120 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the user devices 103, the one or more digital vault devices 110 and/or the one or more vault proxy servers 120 to communicate in some embodiments over the network 104 with each other (as well as one or more other networked devices, not shown), and illustratively comprises one or more conventional transceivers.

It is to be understood that the particular set of elements shown in FIG. 1 for data protection using policy-based digital vault rotation is presented by way of illustrative example only, and in other embodiments additional or alternative elements may be used. Thus, another embodiment includes additional or alternative systems, devices and other network entities, as well as different arrangements of modules and other components.

Figure 2:
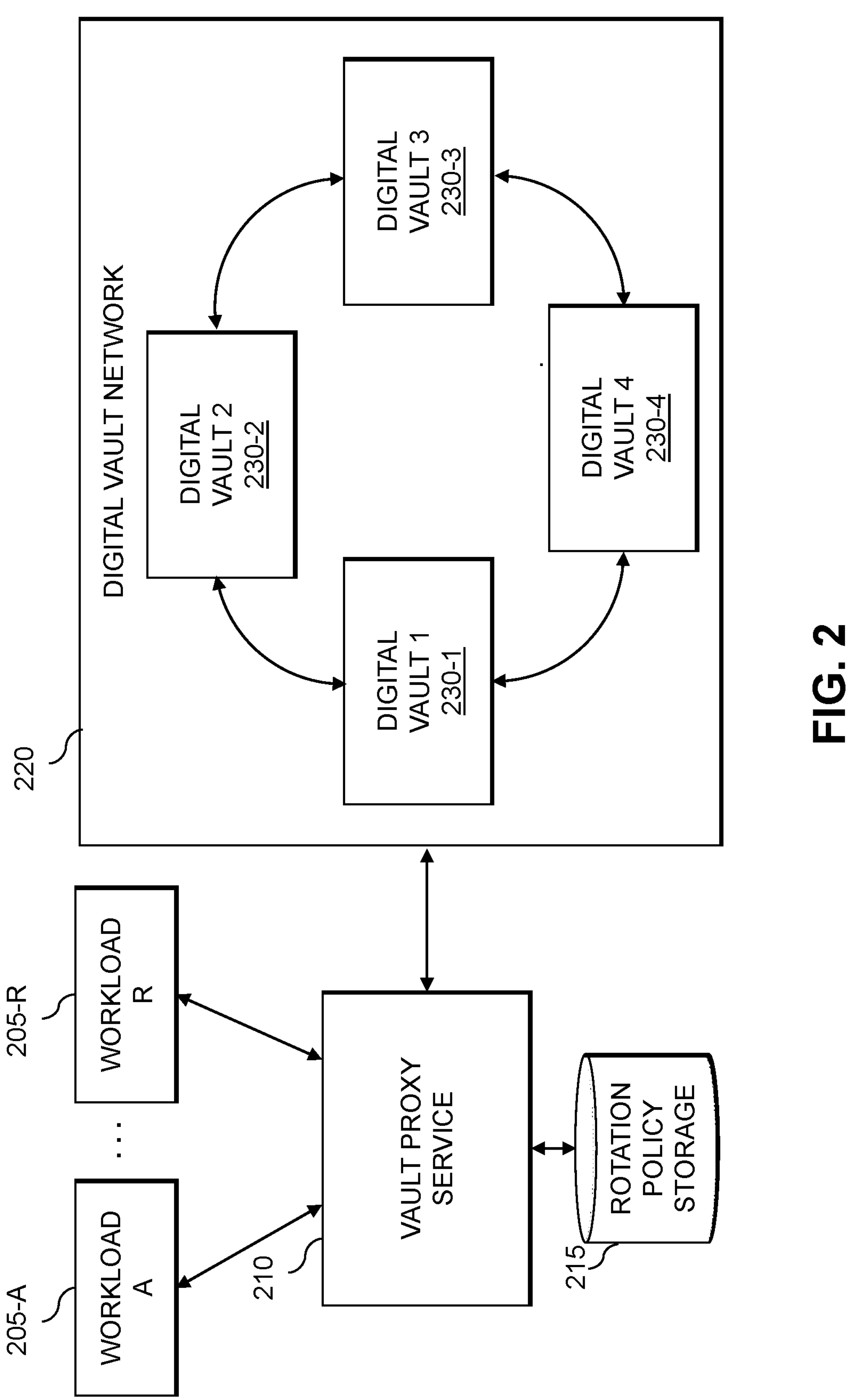
FIG. 2 illustrates a processing of data requests by a vault proxy service using the disclosed data protection techniques in an illustrative embodiment.

FIG. 2 illustrates a processing of data requests by a vault proxy service 210 using the disclosed data protection techniques in an illustrative embodiment. In the example of FIG. 2, the vault proxy service 210 receives data requests, for example, in the form of queries or requests for protected data, from one or more workloads 205-A through 205-R, collectively referred to herein as workloads 205. The workloads 205 may comprise, in some embodiments, approved workloads having appropriate access privileges for the requested data, or have otherwise established trust with the vault proxy service 210, for example, to obtain keys and/or access tokens to identify the workloads 205 as authorized to access the requested information.

In the FIG. 2 embodiment, protected data is stored in one or more digital vaults 230-1 through 230-4, for example, of a digital vault network 220. The digital vaults 230-1 through 230-4 are collectively referred to herein as digital vaults 230. The digital vaults 230, in some embodiments, comprise secure storage devices that are used to store protected information, such as secrets, keys, certificates, and other sensitive data. The digital vaults 230 are designed to provide a high level of security, and may incorporate encryption, access control and/or monitoring mechanisms to ensure that stored information is protected against unauthorized access, theft and/or corruption.

In one or more embodiments, the digital vaults 230 may only respond to the vault proxy service 210, for example, by employing Mutual Transport Layer Security (mTLS) for mutual authentication, or another access control mechanism, as would be apparent to a person of ordinary skill in the art. For example, the digital vaults 230 may be configured such that only the vault proxy service 210 has direct access to one or more of the digital vaults 230 and all other devices must access the one or more digital vaults 230 using the vault proxy service 210. Thus, the one or more digital vaults 230 will only respond to the vault proxy service 210. The vault proxy service 210 thus controls digital vault access, by identifying digital vaults that hold particular information and controlling the movement of stored information among the digital vaults 230.

The vault proxy service 210 may be implemented in some embodiments as a centralized proxy that interacts with the digital vault network 220 for storage and retrieval of protected data in one or more active digital vaults 230. The vault proxy service 210 goes directly to an active digital vault 230 for storage and retrieval of protected information.

The vault proxy service 210 may move data stored in one or more of the digital vaults 230 using a rotation policy from a rotation policy storage 215. The rotation policy may be implemented using one or more rules and/or algorithms to define a systematic movement of data from one digital vault 230 to another digital vault 230 within the digital vault network 220, for example, at appropriate intervals, and/or in response to designated events, to achieve one or more objectives.

In some embodiments, the digital vaults 230 in the digital vault network 220 may be implemented using different persistent memory spaces of a given device and/or may employ persistent memory of different devices (e.g., physical devices and/or virtual devices). Some or all of the digital vaults 230 may be located at different locations, such as different data centers. The digital vaults 230 may be, for example, on a same device as the vault proxy service 210. The digital vaults 230 may be hardened in accordance with secure storage best practices.

Figure 3:
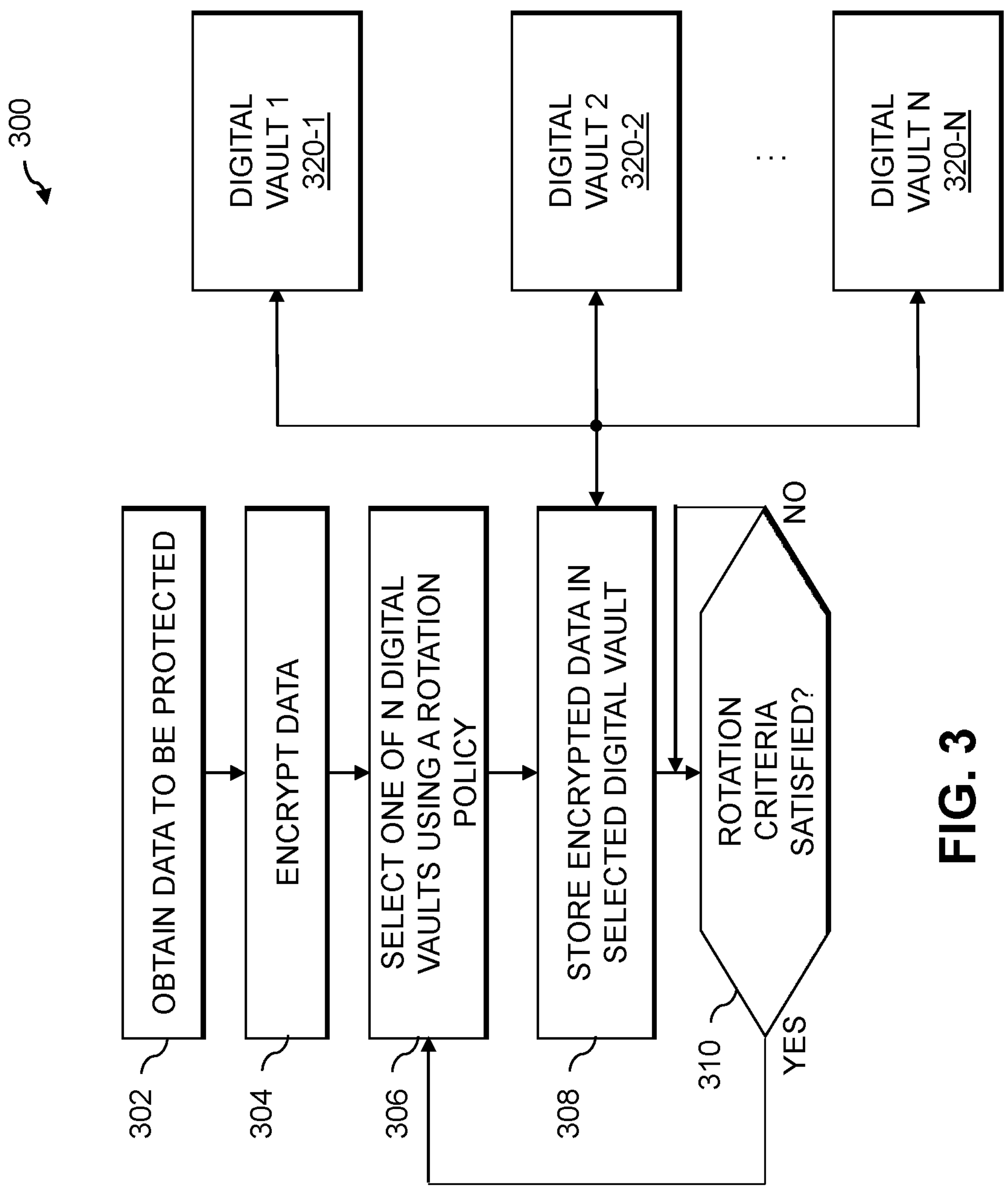
FIG. 3 is a flow chart illustrating an exemplary implementation of a data storage process using the disclosed data protection techniques in an illustrative embodiment.

FIG. 3 is a flow chart illustrating an exemplary implementation of a data storage process 300 using the disclosed data protection techniques in an illustrative embodiment. In the example of FIG. 3, the process 300 obtains, in step 302, data to be protected. As noted elsewhere herein, the data may comprise, for example, secrets, keys, certificates, and/or other sensitive data.

In step 304, the process 300 may encrypt the data. In some embodiments, the data is not encrypted. One of N (e.g., N is at least three in one or more embodiments) digital vaults 320-1 through 320-N is selected in step 306 using a rotation policy. In some embodiments, the initial selection of a digital vault may employ a random selection of a digital vault 320. As noted above, the rotation policy may be implemented using one or more rules and/or algorithms to define a systematic movement of data from one digital vault 320 to another digital vault 320 within a digital vault network, for example, at appropriate intervals, and/or in response to designated events, to achieve one or more objectives. The digital vaults 320 may be implemented using different persistent memory spaces of a given device and/or may employ persistent memory of different devices.

In step 308, the process 300 stores the encrypted (or unencrypted) data in the selected digital vault of the multiple digital vaults 320-1 through 320-N. As noted above, the digital vaults 320 may only communicate with the vault proxy service 210, for example, by employing mTLS or another access control mechanism, as would be apparent to a person of ordinary skill in the art.

A test is performed in step 310 to determine if one or more rotation criteria have been satisfied for the stored data. In some embodiments, the protected information is automatically moved from one digital vault instance to another digital vault instance in accordance with one or more rotation policies, such as time-based policies (e.g., defined by a timing (e.g., a periodic, irregular or random timing) and/or schedule that trigger a vault rotation), event-based policies (e.g., defined by one or more designated events that trigger a rotation), load-based policies (e.g., defined by one or more triggers based on a network load and/or an amount of requests received by the vault proxy service, for example) and/or security-based policies (e.g., defined by one or more triggers based on a security status of one or more elements of the system 100).

If it is determined in step 310 that the one or more rotation criteria have not been satisfied for the stored data, then program control returns to step 310 to monitor the rotation timeout period. If, however, it is determined in step 310 that the one or more rotation criteria have been satisfied for the stored data, then program control returns to step 306 to select a new digital vault for the stored data. For example, the vault proxy service 210 may move the data to a new selected digital vault by reading the stored data from the current digital vault and storing the data in the new selected digital vault.

Figure 4:
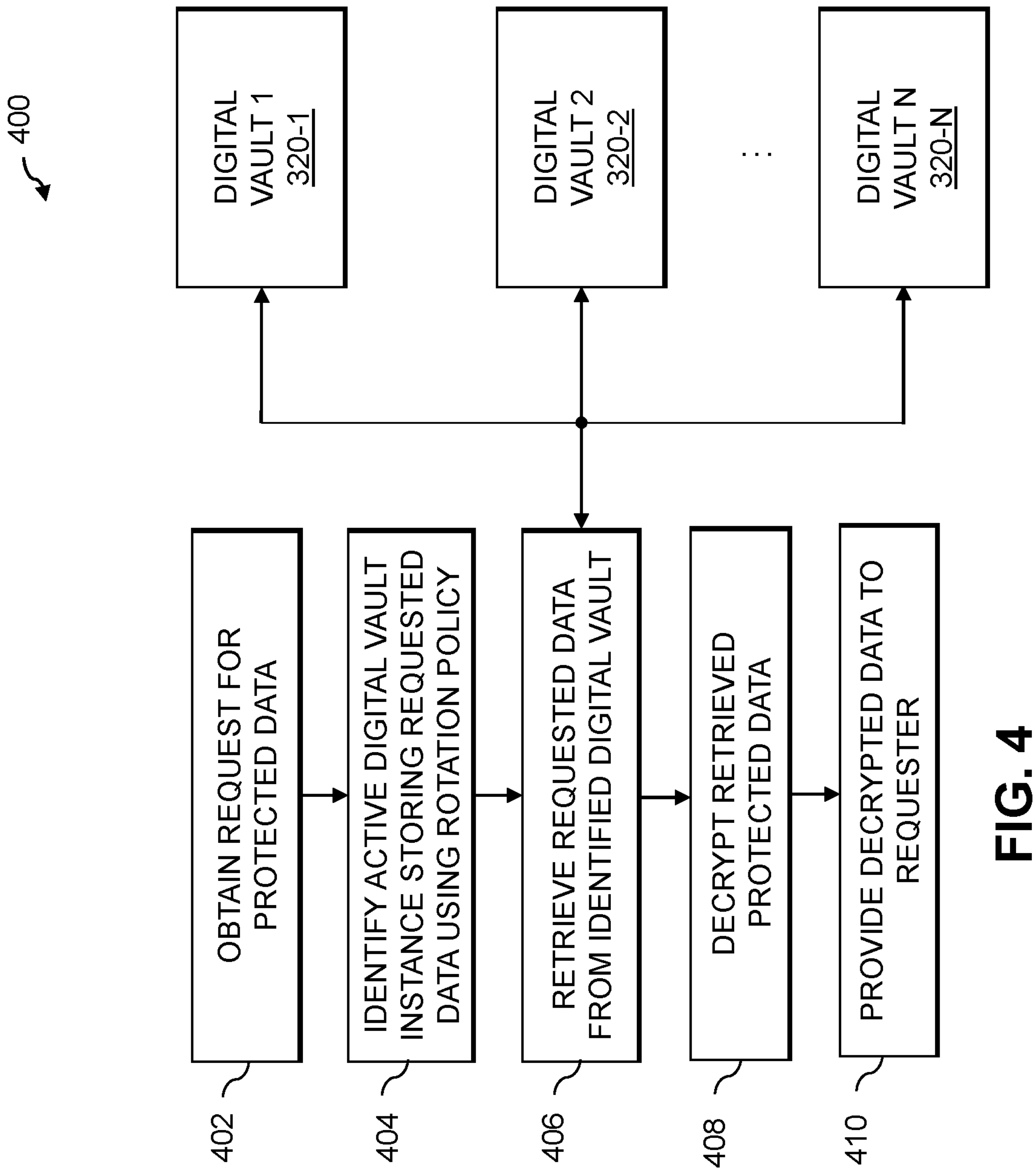
FIG. 4 is a flow chart illustrating an exemplary implementation of a data retrieval process using the disclosed data protection techniques in an illustrative embodiment.

FIG. 4 is a flow chart illustrating an exemplary implementation of a data retrieval process 400 using the disclosed data protection techniques in an illustrative embodiment. In the example of FIG. 4, the process 400 obtains, in step 402, a request for protected data. The request may comprise, for example, a query and/or an operation (e.g., a read, write or delete operation) that operate on data in one or more of the digital vaults 320.

In step 404, the process 400 identifies an active digital vault instance (from among digital vaults 320-1 through 320-N) storing the requested data using the rotation policy. The requested data is retrieved from the identified digital vault in step 406. In step 408, the process 400 may decrypt the retrieved data (e.g., if the data was encrypted upon storage). In other embodiments, the stored data is not encrypted and therefore does not need to be decrypted in step 408. The decrypted data is provided to the requester (e.g., a workload 205) in step 410.

Figure 5:
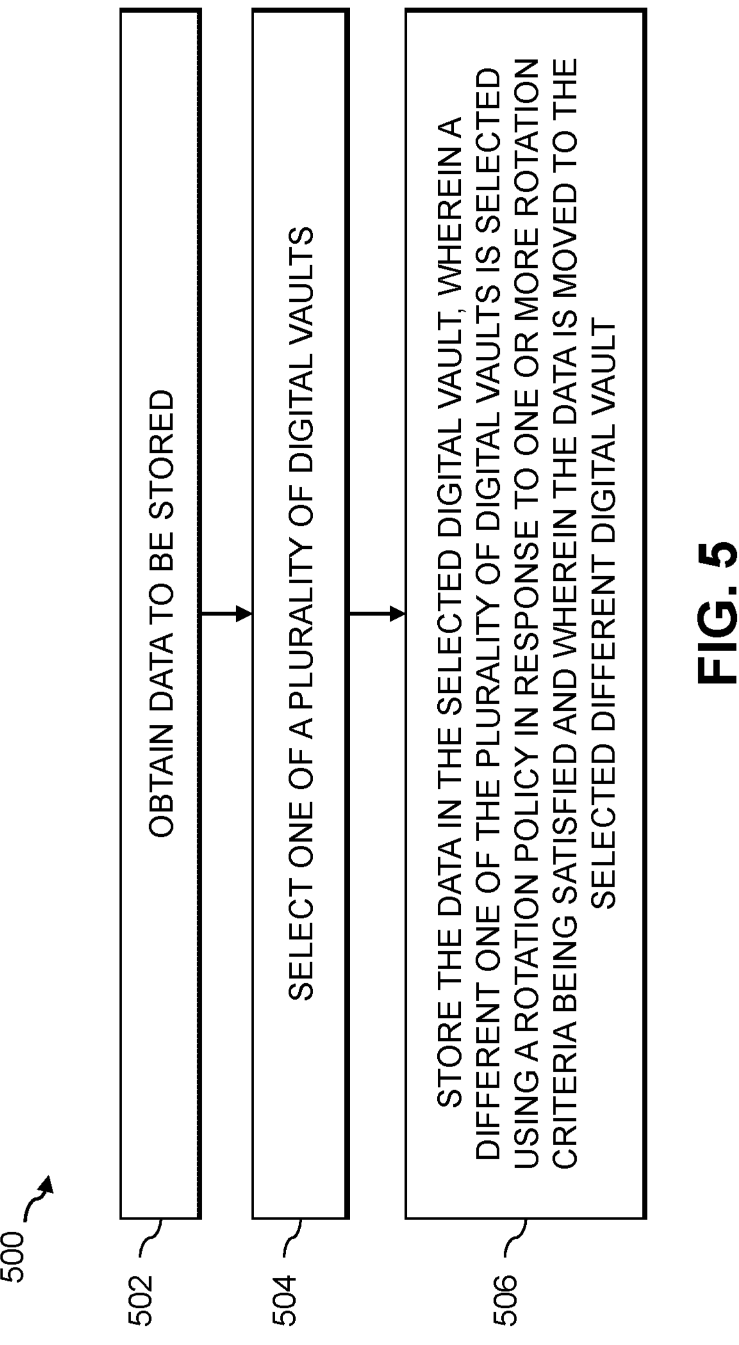
FIG. 5 is a flow chart illustrating an exemplary implementation of a process for data protection using policy-based digital vault rotation in an illustrative embodiment.

FIG. 5 is a flow chart illustrating an exemplary implementation of a process 500 for data protection using policy-based digital vault rotation in an illustrative embodiment. The process 500 may be performed, for example, by the vault proxy service module 122 of the vault proxy server 120 of FIG. 1. In the example of FIG. 5, the process 500 obtains, in step 502, data to be stored. In step 504, one of a plurality of digital vaults is selected. In step 506, the data is stored in the selected digital vault, wherein a different one of the plurality of digital vaults is selected using a rotation policy in response to one or more rotation criteria being satisfied and wherein the data is moved to the selected different digital vault.

In some embodiments, the data may be encrypted. The data may comprise one or more of a secret, a key, a certificate and designated data. The plurality of digital vaults may comprise one or more of a plurality of digital vaults having different memory spaces of a given device and a plurality of digital vaults on different devices.

In at least one embodiment, the plurality of digital vaults may only respond to one or more designated vault proxy services. The one or more designated vault proxy services may have direct access to one or more of the plurality of digital vaults and other devices access the one or more of the plurality of digital vaults using at least one of the one or more designated vault proxy services.

In one or more embodiments, an active one of the plurality of digital vaults may be identified using the rotation policy in response to a request for at least a portion of the data and the at least a portion of the data may be retrieved from the active digital vault and the at least a portion of the data may be provided to a requester associated with the request.

The particular processing operations and other network functionality described in conjunction with FIGS. 3 through 5, for example, are presented by way of illustrative example only, and should not be construed as limiting the scope of the disclosure in any way. Alternative embodiments can use other types of processing operations for data protection using policy-based digital vault rotation. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for data protection using policy-based digital vault rotation can be employed, for example, to improve the security of designated information, reduce the risk of data breaches, and ensure that the stored information is accessible and secure. The use of multiple vault instances and the disclosed key rotation algorithms provide an additional layer of security and ensure that information is protected against hijacking or corruption, for example.

The disclosed techniques for data protection using policy-based digital vault rotation, in some embodiments, provide a "moving target" for a malicious actor, for example, where the protected information is rotated between the vault instances in accordance with the rotation policies. In this manner, it is difficult for a malicious actor, for example, to determine the location of the protected data, as the protected data is moved between the vault instances in accordance with the rotation policies.

In some embodiments, the disclosed vault proxy service provides centralized storage of, and access to, protected information. In addition, the protected information can be monitored and controlled.

One or more embodiments of the disclosure provide improved methods, apparatus and computer program products for data protection using policy-based digital vault rotation. The foregoing applications and associated embodiments should be considered as illustrative only, and numerous other embodiments can be configured using the techniques disclosed herein, in a wide variety of different applications.

It should also be understood that the disclosed data protection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for data protection using policy-based digital vault rotation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based data protection engine, or portions thereof, are illustratively implemented for use by tenants of such a multi-tenant environment.

Cloud infrastructure as disclosed herein can include cloud-based systems. Virtual machines provided in such systems can be used to implement at least portions of a cloud-based data protection platform in illustrative embodiments. The cloud-based systems can include object stores.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
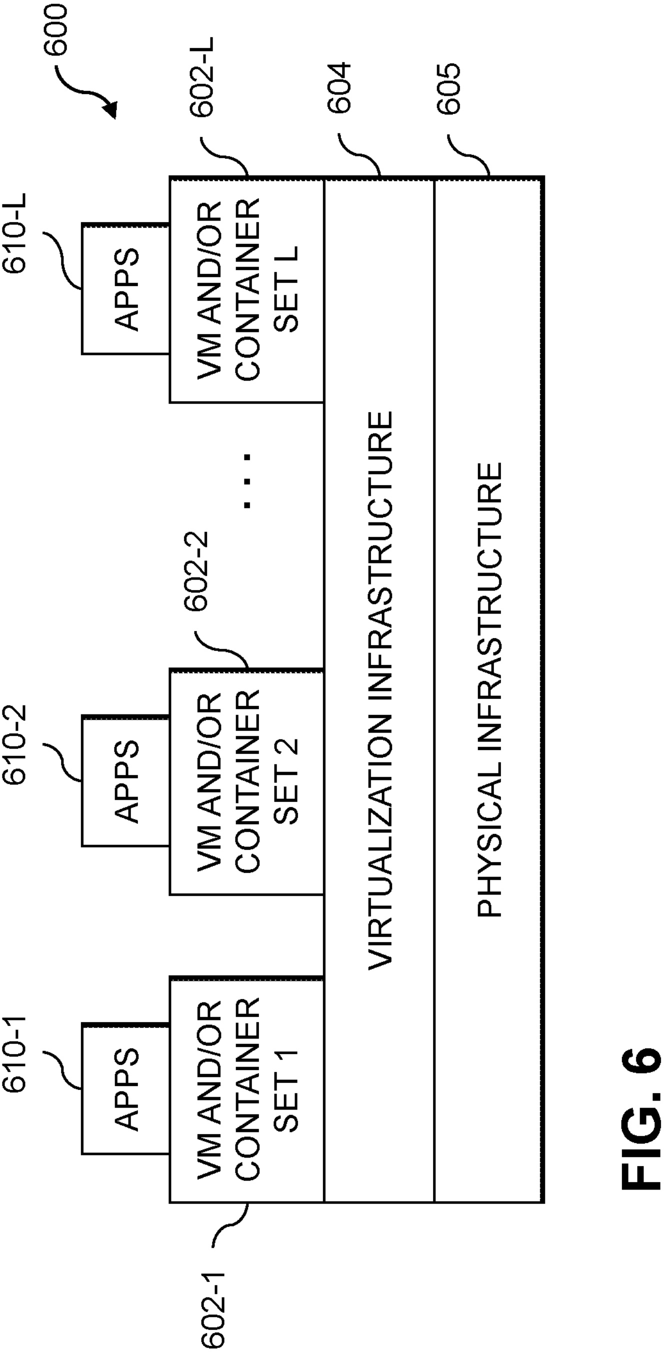
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2 . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2 . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide data protection functionality of the type described above for one or more processes running on a given one of the VMs. For example, each of the VMs can implement data protection control logic and associated vault rotation functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide data protection and mitigation functionality of the type described above for one or more processes running on different ones of the containers. For example, a container host device supporting multiple containers of one or more container sets can implement one or more instances of data protection control logic and associated vault rotation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3 . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
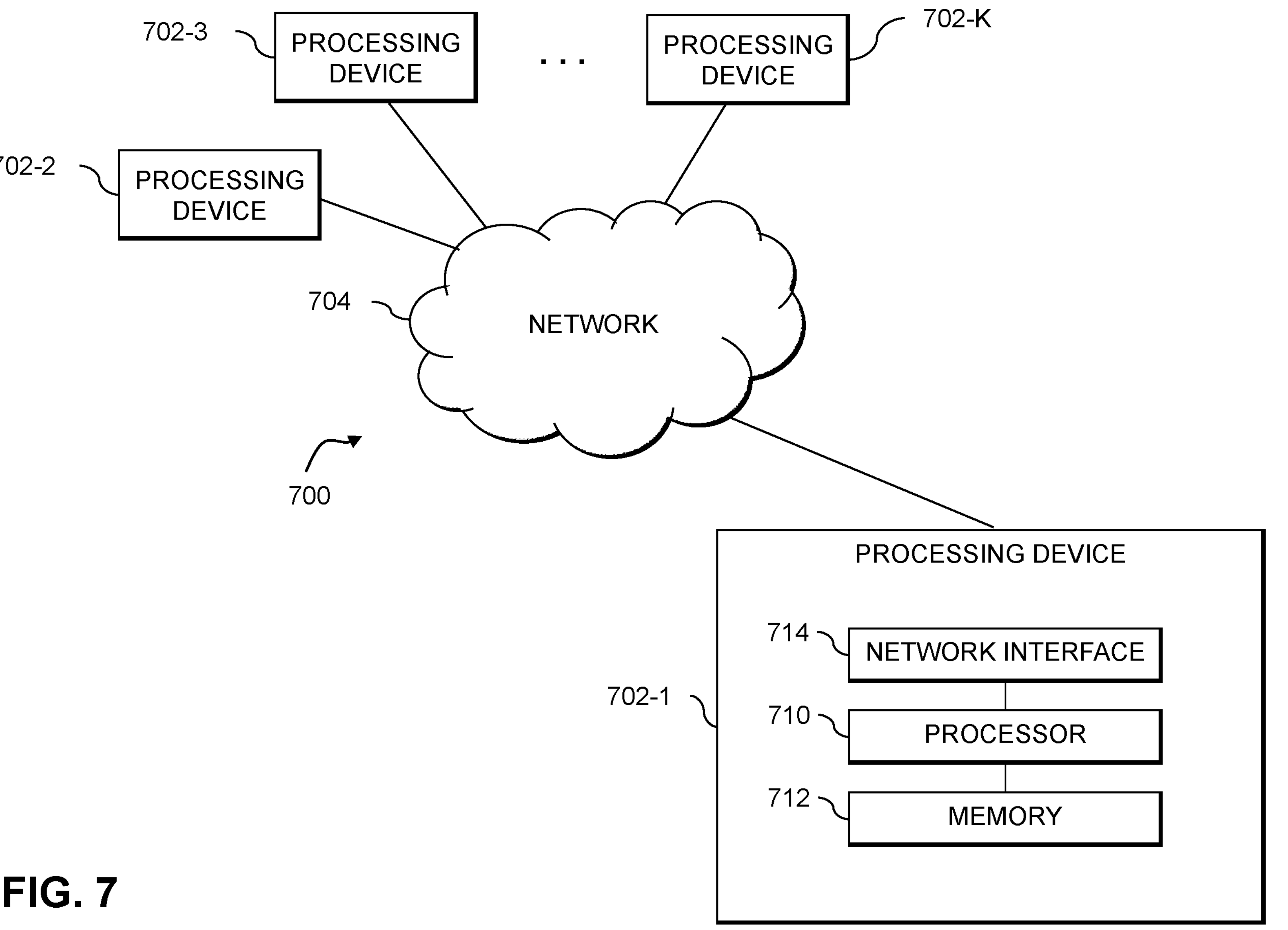
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining data to be stored;

selecting one of a plurality of digital vaults; and storing, by at least one processor-based vault proxy service, the data in the selected digital vault, wherein a different one of the plurality of digital vaults is selected using a rotation policy in response to one or more rotation criteria being satisfied and wherein the data is moved, by the at least one processor-based vault proxy service, to the selected different digital vault, wherein one or more workloads request data stored in one or more of the plurality of digital vaults using the at least one processor-based vault proxy service, wherein the at least one processor-based vault proxy service identifies an active one of the plurality of digital vaults using the rotation policy in response to the request from the one or more workloads for at least a portion of the data;

wherein the method is performed by at least one processing device comprising a processor coupled to a memory.

2. The method of claim 1, further comprising retrieving the at least a portion of the data from the active digital vault and providing the at least a portion of the data to a requester associated with the request.

3. The method of claim 1, wherein the plurality of digital vaults comprises one or more of a plurality of digital vaults having different memory spaces of a given device and a plurality of digital vaults on different devices.

4. The method of claim 1, wherein the plurality of digital vaults only respond to the at least one processor-based vault proxy service.

5. The method of claim 4, wherein only the at least one processor-based vault proxy service has direct access to one or more of the plurality of digital vaults and other devices access the one or more of the plurality of digital vaults using the at least one processor-based vault proxy service.

6. The method of claim 1, wherein the data comprises one or more of a secret, a key, a certificate and designated data.

7. An apparatus comprising:

at least one processing device comprising a processor coupled to a memory;

the at least one processing device being configured to implement the following steps:

obtaining data to be stored;

selecting one of a plurality of digital vaults; and storing, by at least one processor-based vault proxy service, the data in the selected digital vault, wherein a different one of the plurality of digital vaults is selected using a rotation policy in response to one or more rotation criteria being satisfied and wherein the data is moved, by the at least one processor-based vault proxy service, to the selected different digital vault, wherein one or more workloads request data stored in one or more of the plurality of digital vaults using the at least one processor-based vault proxy service, wherein the at least one processor-based vault proxy service identifies an active one of the plurality of digital vaults using the rotation policy in response to the request from the one or more workloads for at least a portion of the data.

8. The apparatus of claim 7, further comprising retrieving the at least a portion of the data from the active digital vault and providing the at least a portion of the data to a requester associated with the request.

9. The apparatus of claim 7, wherein the plurality of digital vaults comprises one or more of a plurality of digital vaults having different memory spaces of a given device and a plurality of digital vaults on different devices.

10. The apparatus of claim 7, wherein the plurality of digital vaults only respond to the at least one processor-based vault proxy service.

11. The apparatus of claim 10, wherein only the at least one processor-based vault proxy service has direct access to one or more of the plurality of digital vaults and other devices access the one or more of the plurality of digital vaults using the at least one one processor-based vault proxy service.

12. The apparatus of claim 7, wherein the data comprises one or more of a secret, a key, a certificate and designated data.

13. A non-transitory processor-readable storage medium having stored therein program code of one or more software programs, wherein the program code when executed by at least one processing device causes the at least one processing device to perform the following steps:

obtaining data to be stored;

selecting one of a plurality of digital vaults; and storing, by at least one processor-based vault proxy service, the data in the selected digital vault, wherein a different one of the plurality of digital vaults is selected using a rotation policy in response to one or more rotation criteria being satisfied and wherein the data is moved, by the at least one processor-based vault proxy service, to the selected different digital vault, wherein one or more workloads request data stored in one or more of the plurality of digital vaults using the at least one processor-based vault proxy service, wherein the at least one processor-based vault proxy service identifies an active one of the plurality of digital vaults using the rotation policy in response to the request from the one or more workloads for at least a portion of the data.

14. The non-transitory processor-readable storage medium of claim 13, further comprising retrieving the at least a portion of the data from the active digital vault and providing the at least a portion of the data to a requester associated with the request.

15. The non-transitory processor-readable storage medium of claim 13, wherein the plurality of digital vaults comprises one or more of a plurality of digital vaults having different memory spaces of a given device and a plurality of digital vaults on different devices.

16. The non-transitory processor-readable storage medium of claim 13, wherein the plurality of digital vaults only respond to the at least one processor-based vault proxy service.

17. The non-transitory processor-readable storage medium of claim 16, wherein only the at least one processor-based vault proxy service has direct access to one or more of the plurality of digital vaults and other devices access the one or more of the plurality of digital vaults using the at least one processor-based vault proxy service.

18. The method of claim 1, wherein the at least one processor-based vault proxy service moves the data to the selected different digital vault by reading the stored data from the selected digital vault and storing the data in the selected different digital vault.

19. The apparatus of claim 7, wherein the at least one processor-based vault proxy service moves the data to the selected different digital vault by reading the stored data from the selected digital vault and storing the data in the selected different digital vault.

20. The non-transitory processor-readable storage medium of claim 13, wherein the at least one processor-based vault proxy service moves the data to the selected different digital vault by reading the stored data from the selected digital vault and storing the data in the selected different digital vault.

* * * * *